W. J. PIERCE.
SHOCK ABSORBER FOR VEHICLES.
APPLICATION FILED MAY 31, 1910.
979,032.
Patented Dec. 20, 1910.
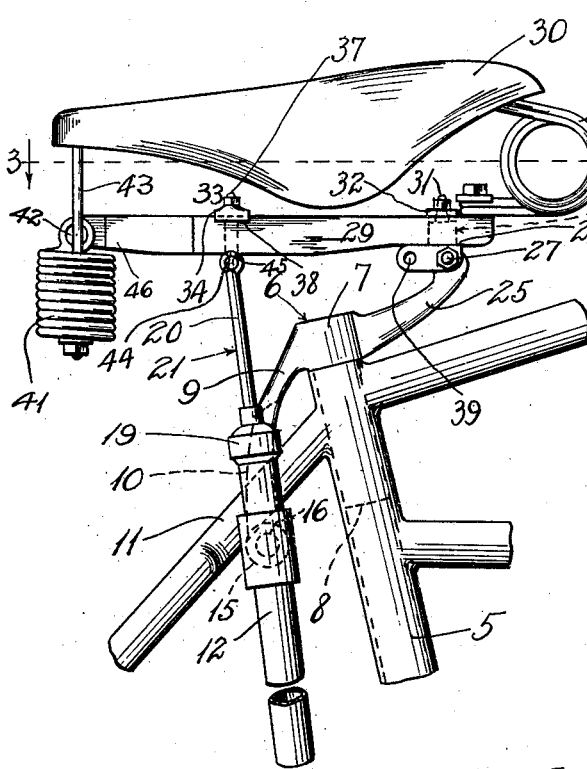
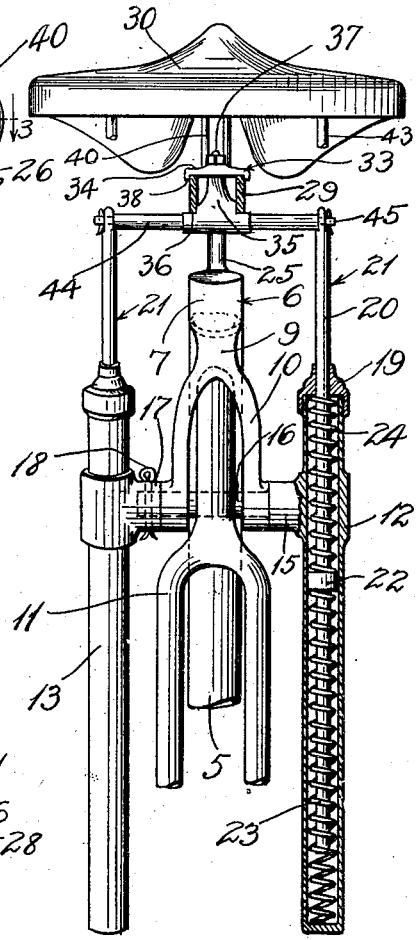
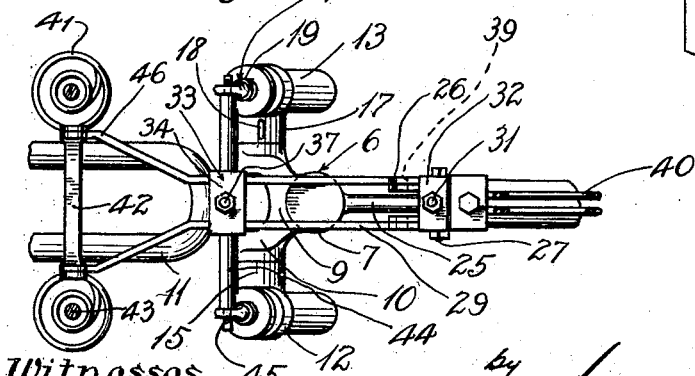
Witnesses.
Inventor:
William J. Pierce.
by
Attys.

UNITED STATES PATENT OFFICE.

WILLIAM J. PIERCE, OF LOS ANGELES, CALIFORNIA.

SHOCK-ABSORBER FOR VEHICLES.

979,032. Specification of Letters Patent. Patented Dec. 20, 1910.

Application filed May 31, 1910. Serial No. 564,075.

*To all whom it may concern:*

Be it known that I, WILLIAM J. PIERCE, a citizen of the United States, residing at Los Angeles, in the county of Los Angeles and State of California, have invented new and useful Improvements in Shock - Absorbers for Vehicles, of which the following is a specification.

This invention relates to a shock absorber and it is particularly applicable to the saddles of bicycles and motorcycles in order to take up the shock or vibration incident to passing over rough roadways.

The object of the invention is to provide an improved saddle support which can be readily attached to the frame of the bicycle or motorcycle without necessitating a special construction of the frame; further to provide a construction for the shock absorber which will give a desirable adjustability and great resiliency. The entire device is constructed so that it can be substituted for the ordinary saddle at the seat post of the frame.

In the drawing forming a part of the annexed specification Figure 1 is a side elevation showing the device in position and showing the adjacent part of the frame, certain parts are broken away. Fig. 2— is a rear elevation and partial section, further illustrating details of the construction. Fig. 3— is a plan of the device with the saddle removed and this view may be regarded as a section of the line 3—3 of Fig. 1. Fig. 4— is a front elevation of a knuckle which is employed for securing the saddle at its forward end, and representing the same removed.

Referring more particularly to the parts 5 represents a seat mast of the frame of the bicycle or motorcycle to which the invention is applied. This mast is usually tubular in form and upon its upper end, I mount a bracket 6 which is in the form of a hub 7 from which the seat post 8 extends downwardly into the interior of the tubular mast, as indicated. This bracket 6 is formed with a downwardly and rearwardly projecting arm 9 which forms two forks 10 which straddle the rear fork bar 11 of the frame and the lower ends of these forks support cushion cylinders or spring barrels 12 and 13 as indicated. The barrel 12 which is disposed at the right is formed with a hub 15 from which a shaft 16 extends and this shaft is rotatably mounted in the ends of the forks 10 so as to pass transversely under the fork bar 11 on the frame as shown. The spring barrel 13 is provided with a hub 17 similar to the hub 15 and this hub is attached by a split pin 18 to the end of the shaft 16. The spring barrels 12 and 13 are provided with screw caps 19 through which the rods 20 of plungers 21 extend downwardly and these rods are formed within the barrels 12 and 13 and at an intermediate point on their length with piston heads 22. Below these heads 22 heavy coiled springs 23 are provided in the spring barrels and the lower ends of these springs thrust against the bottoms of the barrels as shown in Fig. 2. On the upper sides of the heads 22 light coiled springs 24 are provided which are disposed around the rods and these springs thrust against the under sides of the caps 19 and against the upper sides of the heads 22 as indicated. They cushion the return or upward movement of the load.

The bracket 6 is formed with an upwardly and forwardly projecting arm 25 and on the upper end of this arm 25 a knuckle 26 illustrated in Fig. 4, is pivotally attached by means of a suitable pivot bolt 27. The body of this knuckle is in the form of an elongated block having shoulders 28 which form sides or rests for the forward ends of a saddle bar formed of two bars 29 which are disposed in a horizontal position under the saddle 30 as shown in Fig. 1. The knuckle 26 is formed with a stud 31 which passes up between these saddle bars and a clamping plate 32 is attached to the upper end of this stud so as to clamp the bars 29 securely on the shoulders 28. At an intermediate point on their length the saddle bars 29 are provided with an adjustable clamp 33 having a cap plate 34 and having a body 35 representing shoulders 36 as indicated in Fig. 2 to receive the lower edges of the saddle bars. A clamping screw 37 is received in the upper end of the clamping member 35 and the upper end of the clamping member is tapered as shown in Fig. 2. The cap plate 34 of the clamp 33 is formed with flanges 38 at its ends which project down over the upper edges of the saddle bars 29 and prevent their spreading apart. As indicated in Fig. 1 the knuckle 26 is elongated in a front and rear direction and its rear portion is formed with an opening 39 by means of which an adjustment is secured at this point, said adjustment being secured by removing the pivot bolt 27 and applying the same through the opening 39 of the knuckle. In this way the position of the pivotal support for the forward end of the saddle can be adjusted in a front and rear direction with respect to the saddle 30.

The saddle 30 is supported on the forward ends of the saddle bars 29 by a spring 40 of any suitable form which may be secured in place as indicated. The rear end of saddle 30 is supported at the rear end of the saddle bars 29 by means of coiled springs 41 which are pivotally suspended from the bars 42. To the lower ends of these coiled springs, stems 43 are attached which extend downwardly from the saddle so as to give a resilient downward movement of the saddle with respect to the saddle bars at the rear. The clamping bar 35 is attached to the middle of a cross bar or equalizer bar 44 which extends transversely under the saddle bars 29 and is pivotally attached at 45 to the rods 20. Attention is called to the fact that the hubs 15 and 17 are formed on the spring barrels 12 and 13 near the upper ends thereof. The rear ends of the saddle bars 29 are formed with diverging extensions 46 to the rear ends of which the springs 41 are attached as shown in Fig. 3. Any suitable means may be provided (though not illustrated) for securing said seat post 8 in the seat-mast 5.

With a construction such as that described it will be evident that by loosening the clamping plates 32 and 34 the saddle bars may be adjusted in a front and rear direction, furthermore the point of attachment of the clamping bars 34 and 35 may be adjusted without adjusting the forward end of the saddle bars. This independent adjustment follows from the pivotal mounting of the spring barrels on the shaft 16.

It will be evident that with the construction described it is possible to remove the ordinary saddle and substitute my shock absorbing device with its saddle, there being no attachment to the main frame of the bicycle or motorcycle except that which is made at the seat post 8.

What I claim is:—

1. A shock absorber consisting of a bracket having rearwardly extending forks, and having a seat post adapted to be removably attached to a bicycle frame, said seat post and said bracket being rigid with each other and removable as one piece from the bicycle frame, a saddle bar, means for pivotally supporting said saddle bar on said bracket at one point, and means for resiliently supporting said saddle bar on said bracket on said forks.

2. A shock absorber consisting of a bracket having a seat post adapted to be received in the seat mast of a bicycle frame, said bracket having a forwardly extending arm and having a rearwardly extending arm, said arms being rigid with said post, a saddle bar pivotally attached to said forward arm, and means for resiliently supporting the rear portion of said saddle bar on said rear arm.

3. A shock absorber comprising a bracket adapted to be attached to a frame of a motorcycle or bicycle having a forwardly projecting arm and having a rearwardly extending arm terminating in forks, cushion barrels mounted on said forks, rods extending upwardly from said cushion barrels, and a saddle bar pivotally attached to said forward arm, and means for attaching the upper ends of said rods to said saddle bar.

4. A shock absorber comprising a bracket adapted to be attached to the frame of a bicycle having an upwardly projecting arm and having a rearwardly projecting arm forming forks, spring barrels pivotally attached to said forks, rods extending upwardly from said spring barrels, a saddle bar, means for attaching said saddle bar to said forward arm, and means for attaching said rods to said saddle bar.

5. A shock absorber comprising a bracket adapted to be attached to a frame of a bicycle or motorcycle, having a forwardly projecting arm and a rearwardly projecting arm, a knuckle adjustably attached to the forward end of said forward arm, a saddle bar adjustably attached to said knuckle and means for resiliently supporting said saddle bar on said rear arm.

6. A shock absorber comprising a bracket having an upwardly projecting arm, a knuckle pivotally attached to said arm having shoulders formed on the upper sides thereof, saddle bar supported on said shoulders, means for clamping said saddle bars on said shoulders, and means for resiliently supporting the rear portion of said saddle bars on said brackets.

In witness that I claim the foregoing I have hereunto subscribed my name this 23rd day of May, 1910.

W. J. PIERCE.

Witnesses:
F. D. AMMEN,
EDMUND A. STRAUSE.